United States Patent
Greenberg et al.

(12)

(10) Patent No.: US 11,890,755 B2
(45) Date of Patent: *Feb. 6, 2024

(54) INTELLIGENT TRACK AND NAVIGATION FOR SENSOR CARRIER

(71) Applicant: IUNU, INC., Seattle, WA (US)

(72) Inventors: Adam Phillip Takla Greenberg, Seattle, WA (US); Matthew Charles King, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,783

(22) Filed: Jun. 27, 2022

(65) Prior Publication Data
US 2022/0347836 A1 Nov. 3, 2022

Related U.S. Application Data

(63) Continuation of application No. 16/155,849, filed on Oct. 9, 2018, now Pat. No. 11,370,108.

(51) Int. Cl.
*G06F 17/00* (2019.01)
*B25J 5/02* (2006.01)
(Continued)

(52) U.S. Cl.
CPC ........ *B25J 5/02* (2013.01); *A01G 7/00* (2013.01); *A01G 9/143* (2013.01); *B25J 9/0093* (2013.01);
(Continued)

(58) Field of Classification Search
CPC ........ B25J 5/02; B25J 9/0093; B25J 19/0025; A01G 7/00; A01G 9/143; B65G 47/53; B65G 47/60; Y02A 40/25
(Continued)

(56) References Cited

U.S. PATENT DOCUMENTS 4,612,996 A * 9/1986 Wolf .................... A01B 69/007
104/165
5,684,476 A 11/1997 Anderson
(Continued)

FOREIGN PATENT DOCUMENTS

CA 3078813 A1 4/2019
CA 2875138 C * 7/2020 ............. A01B 19/00
(Continued)

OTHER PUBLICATIONS

Sensors (Integrated Indoor Positioning System of Greenhouse Robot . . . ) (Year: 2022).*
(Continued)

*Primary Examiner* — Ronnie M Mancho

(57) ABSTRACT

Systems and techniques for a sensor carrier, and intelligent track infrastructure for the navigation and operation of the sensor carrier are described. The sensor carrier is an autonomous robot navigating a track. The carrier holds cameras and other sensors to receive horticultural images and telemetry for plants in a grow operation. The carrier reads embedded signals in the track including Radio Frequency Identifier (RFID) tags, embedded positioning magnets, and drilled hole patterns for a beam breaking system to determine navigation and operation. For tracks placed at sharp angles, a transfer station with wall guards to prevent the carrier from falling enable safe transfers from different track segments. Additional features include an emergency stop (e-stop) switch and power management for autonomous sensor carriers.

20 Claims, 9 Drawing Sheets

Related U.S. Application Data

(60) Provisional application No. 62/570,615, filed on Oct. 10, 2017.

(51) Int. Cl.
    *B25J 9/00*         (2006.01)
    *B25J 19/00*       (2006.01)
    *B65G 47/60*      (2006.01)
    *B65G 47/53*      (2006.01)
    *A01G 9/14*       (2006.01)
    *A01G 7/00*       (2006.01)

(52) U.S. Cl.
    CPC .......... *B25J 19/0025* (2013.01); *B65G 47/53* (2013.01); *B65G 47/60* (2013.01)

(58) Field of Classification Search
    USPC ....................................................... 700/245
    See application file for complete search history.

(56) References Cited

U.S. PATENT DOCUMENTS

| | | | |
|---|---|---|---|
| 8,453,380 | B1 | 6/2013 | Helder et al. |
| 9,452,525 | B2 | 9/2016 | Ziegler et al. |
| 10,528,048 | B2 * | 1/2020 | Cavender-Bares .... A01C 7/004 |
| 11,370,108 | B2 * | 6/2022 | Greenberg ............... A01G 7/00 |
| 2002/0110057 | A1 | 8/2002 | Kadlec et al. |
| 2004/0195318 | A1 | 10/2004 | Silverbrook et al. |
| 2006/0266828 | A1 | 11/2006 | Silverbrook et al. |
| 2008/0251585 | A1 | 10/2008 | Silverbrook et al. |
| 2011/0046776 | A1 | 2/2011 | Goldman et al. |
| 2016/0146638 | A1 | 5/2016 | Dixon et al. |
| 2016/0219794 | A1 | 8/2016 | Greenberg et al. |
| 2017/0234980 | A1 | 8/2017 | Zhang |
| 2019/0105768 | A1 | 4/2019 | Greenberg et al. |
| 2020/0125098 | A1 * | 4/2020 | Cavender-Bares ........................ G05D 1/0088 |
| 2021/0132608 | A1 * | 5/2021 | Cavender-Bares ...... B25J 5/007 |

FOREIGN PATENT DOCUMENTS

| | | | | |
|---|---|---|---|---|
| CA | 2930849 | C * | 2/2022 | ............. A01B 51/02 |
| EP | 3071009 | B1 * | 12/2020 | ............. A01B 51/02 |
| EP | 3827654 | A1 * | 6/2021 | ............. A01B 51/02 |
| WO | 2007016407 | A1 | 2/2007 | |
| WO | 2015004472 | A2 | 1/2015 | |
| WO | 2015004472 | A2 | 3/2015 | |
| WO | 2019075129 | A1 | 4/2019 | |

OTHER PUBLICATIONS

Canadian Patent Application No. 3,078,813, Examiner's Report dated Jun. 14, 2021, 3 pages.
Canadian Patent Application No. 3,078,813, Office Action dated Jan. 24, 2022, 3 pages.
European Patent Application No. 18866063.3, Search Report dated Jun. 25, 2021, 7 pages.
International Application No. PCT/US2018/055302, International Search Report and Written Opinion dated Dec. 4, 2019, 12 pages.
Japanese Patent Application No. 2020-518801, Office Action dated Mar. 19, 2021, 4 pages.
U.S. Appl. No. 16/155,849, Notice of Allowance dated Mar. 8, 2022, 78 pages.
U.S. Appl. No. 16/155,849, Office Action dated Nov. 22, 2021, 33 pages.
European Patent Application No. 23169841.6, Extended Search Report dated Jul. 26, 2023, 7 pages.

* cited by examiner ically high precision of control, many of the scenes, e.g., the autonomous carriers into the page is that features of the

INTELLIGENT TRACK AND NAVIGATION FOR SENSOR CARRIER

CROSS-REFERENCE TO RELATED APPLICATIONS

This application is a continuation of U.S. application Ser. No. 16/155,849 filed Oct. 9, 2018, entitled "Intelligent Track and Navigation for Sensor Carrier" which claims priority to provisional patent application Ser. No. 62/570,615 filed on Oct. 10, 2017, entitled "Intelligent Track and Navigation for Sensor Carrier". The above-identified applications are hereby incorporated by reference.

BACKGROUND

Horticultural operations are experiencing a boom with Agricultural Technology ("AgroTech"). In AgroTech, plants and other aspects of grow operations are surrounded by sensors which provide telemetry which are aggregated in a central station for further analysis. Analysis of the received telemetry provides a farmer or grower feedback as to the state of his or her crop. In this way, problems with crops can be detected and addressed quickly, thereby optimizing yields and lowering grow operational costs.

Presently, there is not a cost-effective way to instrument grow operations with sensors. Grow operations are increasing in complexity and scale. Accordingly, AgroTech operations are expected to match this growth while controlling cost of instrumentation.

BRIEF DESCRIPTION OF THE DRAWINGS

The Detailed Description is set forth with reference to the accompanying figures.

DETAILED DESCRIPTION

Context of an Intelligent Track and Navigation for a Sensor Carrier

AgroTech makes use of a sophisticated set of high performance sensors. There are high fidelity cameras which are able to capture optical images in sufficient detail for making use of computer object recognition techniques. There are also other sensors to monitor environmental variables such as water levels, pH, humidity and temperature. The volume of data collected by high fidelity cameras and sensors is quite large and is sufficient to provide a statistically significant data set for machine learning. Such sensors, transducers, cameras, and other inputs can be expensive. Accordingly, it may not be cost effective to install a set of sensors for each plant.

The approach of the present disclosure is to install one or more autonomous robotic carriers that house one or more high-fidelity cameras and optionally additional sensors. These robots collect telemetry and other inputs from a single plant or location of plants in a grow operation, and then rove on a track to move to then next plant or location of plants. In this way, each plant or location of plants is subjected to high-fidelity imaging and sensing, without a grower having the cost of high-fidelity imaging and sensing for each plant.

Figure 1B:
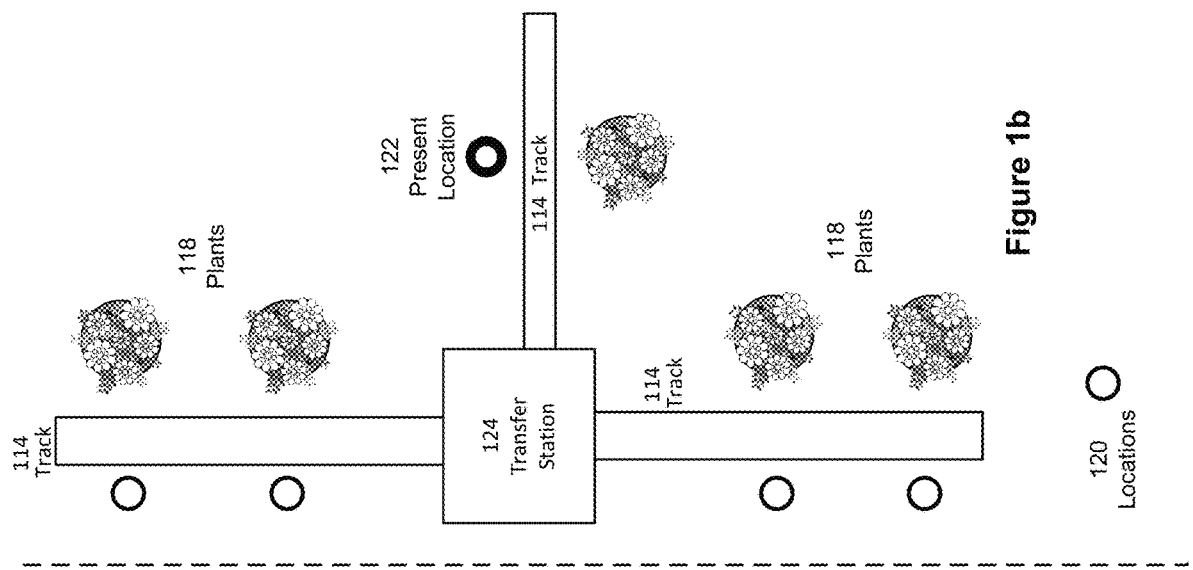
FIGS. 1a and 1b illustrates a top-level context diagrams for an intelligent track and navigation for a sensor carrier.
Figure 1A:
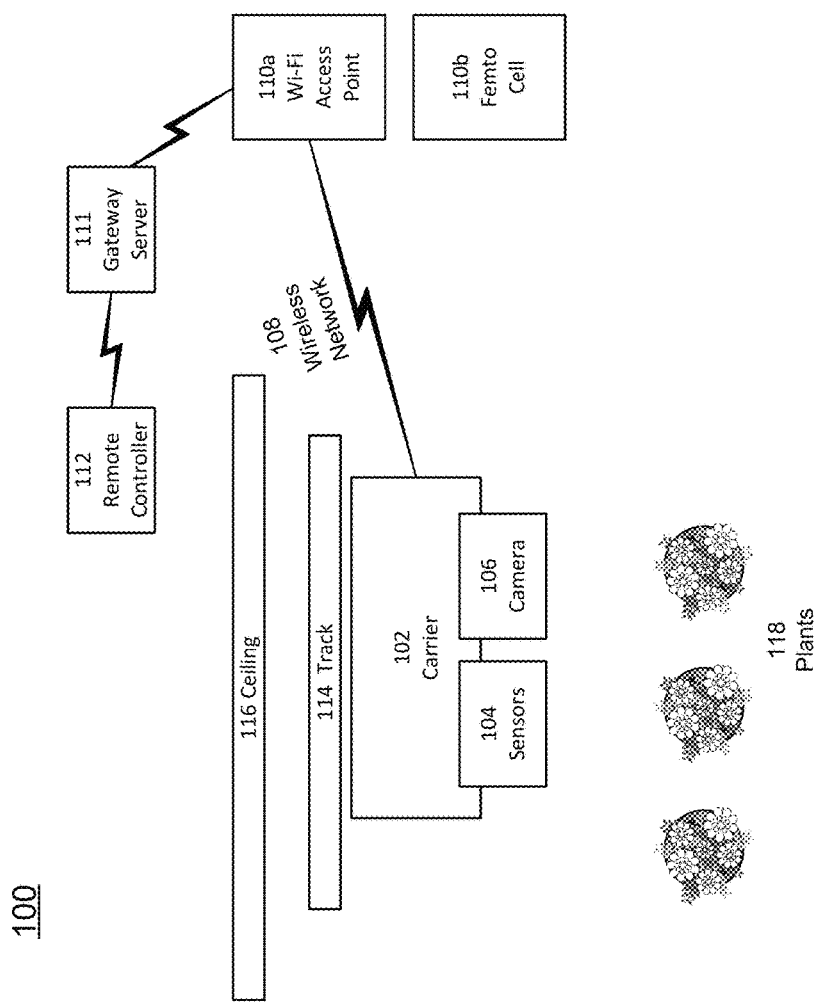

FIG. 1a is a top-level context diagram 100 for an intelligent track and navigation for sensor carriers. In the present disclosure, an autonomous robotic carrier (sometimes called a shuttle or more generically a robot), 102 contains a power system, computing processor, memory, a plurality of sensors 104 and cameras 106 to take telemetry, media capture, or other inputs of plants in a greenhouse. A discussion of the internals of a carrier is provided with respect to FIG. 3 below.

A carrier 102 is networked via a wireless communications network 108 such as a Wi-Fi access point 110a or a cellular network femtocell 110b. On the wireless communications network 108 is a gateway server 111. The gateway server, orchestrates and executes image downloading from a carrier 112. Exemplary algorithms are to use round robin or network priority schemes, or a combination of the two. The gateway server 111 also acts as a local storage waypoint for images as well as data prior to pushing to a cloud-based location. Via the gateway server 111, a remote controller 112 is used to control the carriers, such as the carrier 112, over the wireless communications network 108.

The carriers run on a fixed arrangement of tracks 114 affixed to the ceiling 116 of a greenhouse or other surrounding structure of a horticultural operation. The carrier 102 is inverted, i.e. it runs underneath the track 114, in order to take pictures of the plants underneath 118. The inverted configuration of the carrier 102 is described in further detail with respect to FIG. 4 below.

Since the carrier 102 services multiple plants 118, the carrier 102 is configured to precisely locate itself at least with respect to its mounting track 114. FIG. 1b is a top view of a track 114 showing potential positions 120 of a carrier 102 with respect to the track 114. The bolded circle indicates a specific current location 122 in a greenhouse of the carrier 102 with respect to the track. A description of positioning feedback from the track 114 enabling the carrier 102 to determine its location and to navigate and to effect positioning feedback is described in further detail with respect to FIG. 5 below.

From an operational perspective, industrial systems generally have emergency cutoffs. Since the carriers 102 are autonomous, the intelligent track and navigation for sensor carrier infrastructure features an emergency cutoff to stop carrier operations, even though the carriers 102 are autonomous. This emergency cutoff is described in further detail with respect to FIG. 6 below.

The autonomous nature of the carriers 102 is a recurring theme. Because the carriers 102 are autonomous, there is neither a central controller to recall carriers for recharging, nor is there a separate power line along the track 114. Power management techniques such as system hibernation and other improved power management techniques are described in further detail with respect to FIG. 7 below.

Finally, since carriers 102 are expensive, extra care is taken to ensure the carriers 102 do not fall from the track 114. One point of risk is where a carrier 102 transfers from one track 114 to another, such as when making a turn. A transfer station 124 with a mechanical wall guard is disclosed. The transfer station 124 minimizes the risk that a carrier falls from the track during a turn, transferring of tracks 114 or at the end of a track 114. The transfer station 124 is described in greater detail with respect to FIG. 8.

Figure 2:
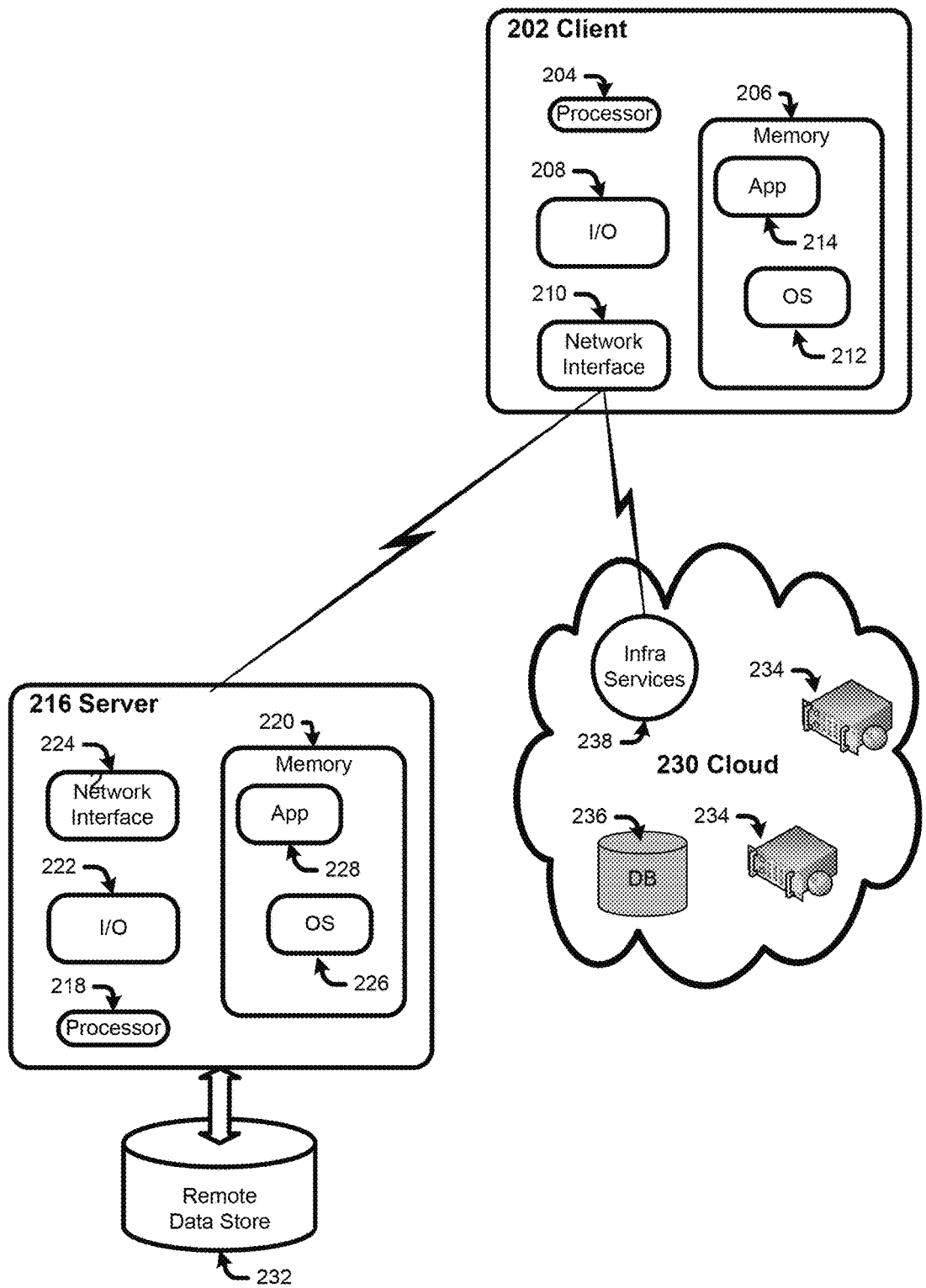
FIG. 2 is a block diagram of an example architecture for an intelligent track and navigation for a sensor carrier.

Exemplary Architecture for an Intelligent Track and Navigation for a Sensor Carrier Prior to describing the carrier and the tracks, the general computing environment is described with respect to FIG. 2.

Functionality for the carriers 102 and for the remote controllers 112 of the carriers are generally hosted on a computing device 202. Exemplary computing devices 202 for the carriers 102 include without limitation small scale computers such as a Raspberry Pi, embedded devices, and repurposed smartphones. Exemplary computing devices 202 for the remote controllers 112 without limitation include personal computers, laptop computers, netbooks, tablet computers and smartphones.

The computing devices 202 are to be networked. The carriers themselves have on board computers as described in further detail with respect to FIG. 3.

The computing device 202 has a processor 204, a memory 206. The processor may be a central processing unit, and/or a dedicated controller such as a microcontroller. The computing device for the may further include an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). In the case of a carrier, a computing device may use the I/O interface 208 for both sensors for navigation, and media capture devices such as a digital camera.

The network interface 210 works in concert with the I/O interface 208 and may be a network interface card supporting Wi-Fi and/or any number of other physical and/or datalink protocols. Alternatively, the network interface 210 may be in the form of a cellular network interface.

Memory 206 is any computer-readable media which may store several software components including an operating system 212 and software components such a control software, media capture/telemetry software and/or other applications 214. In general, a software component is a set of computer-executable instructions stored together as a discrete whole. Examples of software components include binary executables such as static libraries, dynamically linked libraries, and executable programs. Other examples of software components include interpreted executables that are executed on a runtime such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanisms. As defined herein, computer storage media does not include communication media.

A server 216 is any computing device that may participate in a network. The network may be, without limitation, a local area network ("LAN"), a virtual private network ("VPN"), a cellular network, or the Internet. The server 216 has analogous components as to the computing devices 202. Specifically, it will include a processor 218, a memory 220, an input/output interface 222 and a network interface 224. In the memory will be an operating system 226 and application software 228. The role of the server 216 is to aggregate media and telemetry from carriers and to perform analytics and image processing either locally or via the internet and/or cloud 230. Collected/aggregated data may be stored on server-side data store 232.

A service on the cloud 230 may provide the services of a server 216. A server, may either be a physical dedicated server, or may be a virtual machine. In the latter case, the cloud 230 may represent a plurality of disaggregated servers which provide virtual application server 234 functionality and virtual storage/database 226 functionality. The disaggregated servers are physical computer servers, which may have a processor, a memory, an I/O interface and/or a network interface. The features and variations of the processor, the memory, the I/O interface and the network interface are substantially analogous to those described for server 216. Differences may be where the disaggregated servers are optimized for throughput and/or for disaggregation.

Cloud 230 services may be made accessible via an integrated cloud infrastructure 238. Cloud infrastructure 238 not only provides access to cloud services, but also to billing services and other monetization services. Cloud infrastructure 238 may provide additional service abstractions such as Platform as a Service ("PAAS"), Infrastructure as a Service ("IAAS"), and Software as a Service ("SAAS").

Exemplary Carrier Internals and System Block Diagram

Figure 3:
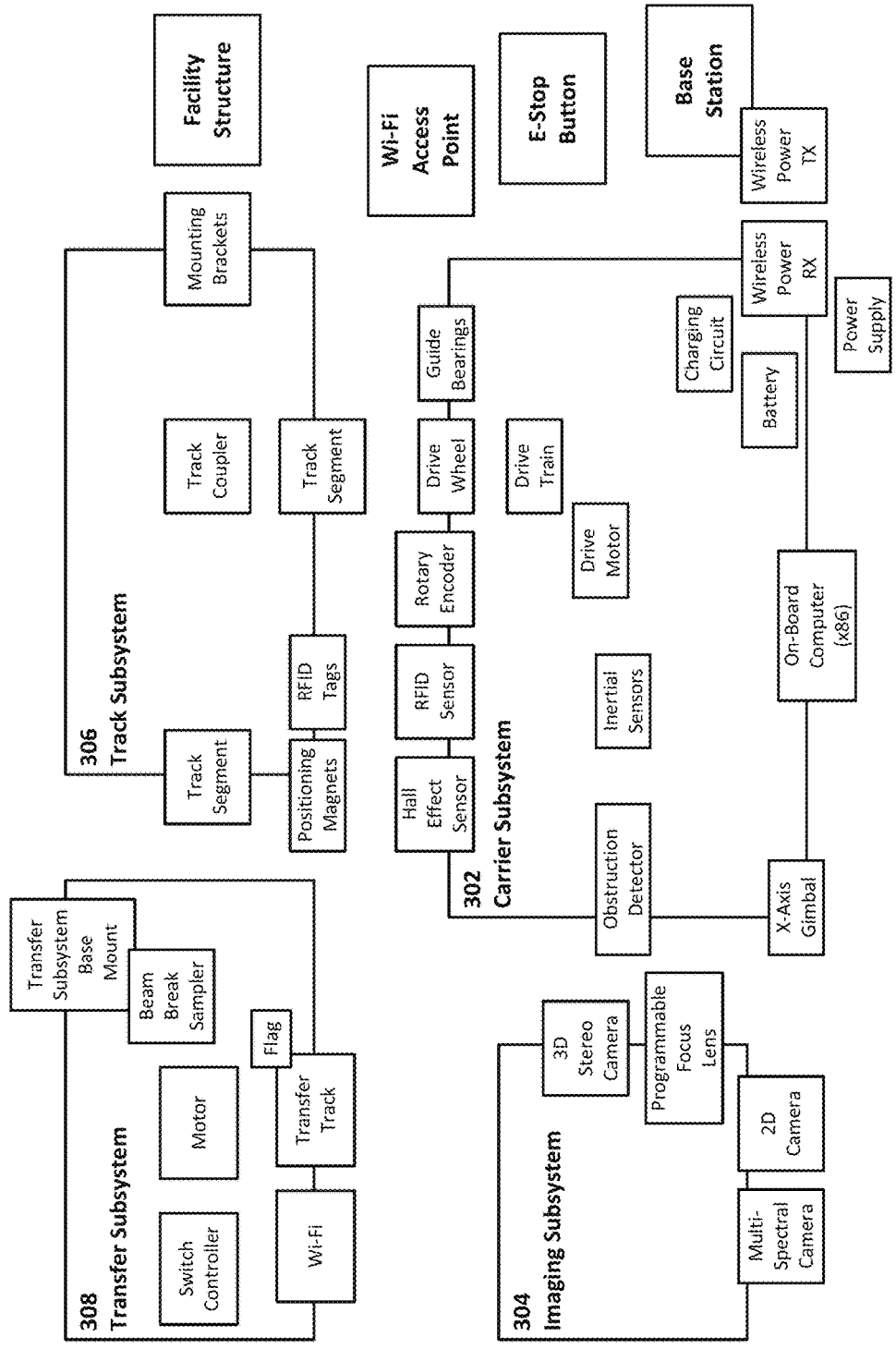
FIG. 3 is a block diagram for is a block diagram of an intelligent track and navigation for a sensor carrier.

The discussion around FIG. 2 describes the computing environment for the carrier 102 and intelligent track 114 in general. FIG. 3 is a block diagram of the intelligent track and navigation for sensor carrier infrastructure 300.

Infrastructure 300 has four major subsystems: the carrier subsystem 302, the imaging subsystem 304, the track subsystem 306 (for track 114), and the transfer station subsystem 308 (for transfer station 124). Each of these subsystems and their communications are described below.

The carrier subsystem 302 performs the functions directed toward moving and navigating the carrier 102. The brains are a processor, such as an Intel x86 based central processing unit (CPU) on an on-board computer. In some embodiments, a supplementary microcontroller such as an STM32 may be used to translate CPU instructions into mechanical instructions to the mechanical portions of the carrier 102. If a microcontroller is used, then the CPU and the microcontroller communicate via a UART.

The on-board computer is networked via Wi-Fi to a Wi-Fi access point in the greenhouse. Alternatively, the network may be a cellular network centered by a femtocell. An emergency stop is configured to directly communicate with the carrier 102 over the network. In this way, the emergency stop may stop a specific carrier 102, or alternatively multiple carriers 102, immediately. The emergency stop is described in further detail with respect to FIG. 6.

The carrier subsystem 302 includes sensors to determine direction, orientation and stability. For example, the carrier subsystem 302 includes both linear and rotational sensors.

Power is stored in a battery managed by a power supply. Power is received externally from a base station from a power receiver mediated by a charging circuit prior to charging the battery. The power from the battery powers not only the processing of the carrier 102, communications, and the motors of the carrier 102, but also the imaging subsystem 304 which is physically mounted on the carrier 102 and whose orientation is directed by a powered multi-axis gimbal.

The imaging subsystem 304 includes 2D still cameras and may optionally be configured with video cameras. In some cases, the cameras are multi-spectral and may use non-visual spectra such as infrared. A camera receives control commands, such as commands to capture images. The camera also receives focusing commands from the on-board computer which also controls a programmable focus lens for the camera.

The imaging subsystem 304 includes a 3D camera, which is a stereo vision camera enabled to communicate depth information. The 3D camera is used by the carrier to inform an obstruction sensor. When the obstruction sensor senses that the carrier 102 is unable to move, the 3D camera can transmit visual information indicating the cause of the obstruction.

Turning back to the carrier subsystem 302, the carrier 102 has a driver motor controlled by the on-board computer which in turn drives a wheel against track 114. The carrier stays on the track 114 via guide bearings.

Navigation of the carrier 102 makes use of three sensors. A rotary encoder measures the revolutions by a guide wheel and calculates the distance that the carrier 102. The carrier 102 then makes use of Radio Frequency Identifier (RFID) tags on the track 114 or positioning magnets on the track 114 and uses an RFID reader or a Hall Effect sensor respectively to detect its position.

The track subsystem 306 is comprised of a plurality of track segments connected with track couplers. The connected track segments constitute track 114 and are connected to the facility structure, such as a ceiling 116 of a greenhouse, via mounting brackets. As previously stated, the track subsystem contains RFID tags and positioning magnets to indicate positions. Positioning feedback is described in further detail with respect to FIG. 5.

The track subsystem 306 also makes use of a coding system of holes in the track segments to indicate position, usually at the end of the track 114. The carrier includes a beam transmitter and a beam receiver with the track in between. While the carrier 102 is passing over track 114 portions without holes, the beam is broken, indicating that the carrier 102 may move without concern of falling off the end of a track 114. When the carrier 102 passes a portion of track 114 with a hole, the beam then shines through and is received by the beam receiver indicating to the carrier that it should stop or slow down to avoid moving off the end of the track 114. The beam breaking technique is described in further detail with respect to FIG. 5.

Note that some track segments may simply end. Other track segments may be connected to one another via a transfer station 124. Accordingly, we now turn to the transfer station subsystem 308. The subsystem 308 includes a coordination of the transfer station 124 and the carrier 102. Both the carrier 102 and the transfer station 124 communicate with each other over the communications network. The communications network may be Wi-Fi or alternatively may be cellular. The transfer station 124 is situated on portions of the track 114 with holes acting as flags indicating position with respect to the transfer station. The transfer station 124 has a base mount with a beam break sensor. The discussion with respect to FIG. 9 describes the operation of the transfer station 124 in more detail.

Inverted Carrier Configuration

Figure 4:
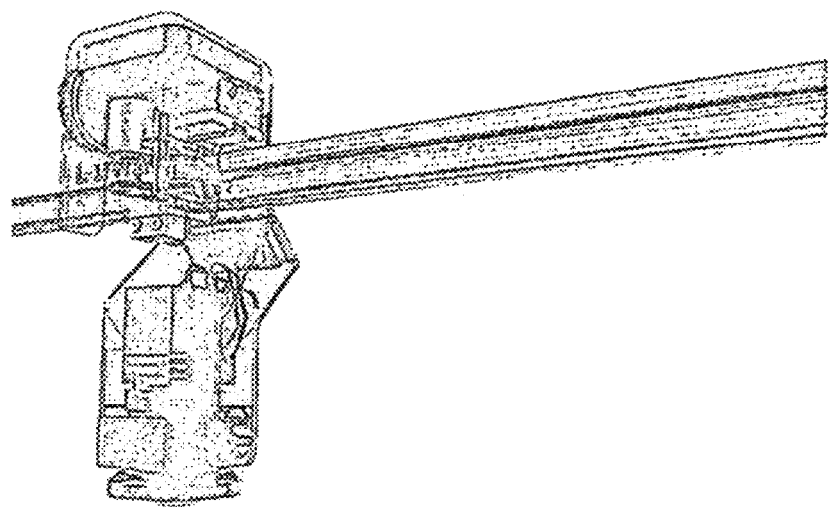
FIG. 4 is an illustration of an inverted orientation for a sensor carrier on an intelligent track.

FIG. 4 is an illustration of the carrier 102 mounted on the track 114. Note that carriers 102 are mounted inverted (i.e. riding underneath the track). The carriers 102 are overhead track-mounted self-propelled robots that use an interconnected track system with transfer stations to enable track switching. A user controls and directs a carrier 102 in a particular direction to a specified location using a set of firmware commands containing distance parameters and/or preconfigured location identifiers. The passive indicators in the track, such as RFID tags and positional magnets may be used to place the carrier 102 on the track, and to receive commands to capture images, capture telemetry, upload data or alternatively to perform maintenance actions such as diagnostics.

Tracking Positional Feedback for a Carrier

An imaging subsystem 304, comprising one or more cameras, rides on a carrier 102. The carrier 102 has positional awareness via several forms of wireless way-finding techniques as follows.

An initial position may be determined with a rolling rotary encoder. A rotary encoder counts ticks and frequency of ticks of a drag wheel corresponding to the revolutions of the drag wheel rolling along the track. This tick count data is then converted to velocity and distance traveled information. In this way, the carrier 102 is aware of its velocity and distance traveled and may combine this information with its navigational path along the track 114 to infer its position.

However, a rotary encoder can only provide position with respect to a known initial position. Additionally, the rotary encoder may suffer slippage error and over time and distance, its readings may become unreliable. To obtain absolute position, the carrier 102 reads either RFID tags using an RFID tag sensor or magnets via Hall Effect sensors to determine its absolute position. The RFID tag sensor and Hall Effect sensors on the carrier 102 sense the presence of passive RFID tags and magnets respectively, that are located periodically along the track. This provides gross positional awareness of which track the carrier 102 is on, and which direction the carrier 102 is facing, and provides its absolute position.

Note that the carrier 102 autonomous. Accordingly, the carrier 102 is configured to have redundant inputs to ensure that broken sensors may be detected and the operation of the carrier 102 does not become faulty. The carrier 102 makes use of optical beam-break sensing to coordinate with the other sensors. Specifically, the optical beam-break sensors detect patterns of drilled holes in the track. These drilled hole patterns may encode a count of track segments traversed, and denote the presence of special track elements, such as a charging station, an RFID track, or an approaching end-of-track or location within a transfer station 124.

Figure 5:
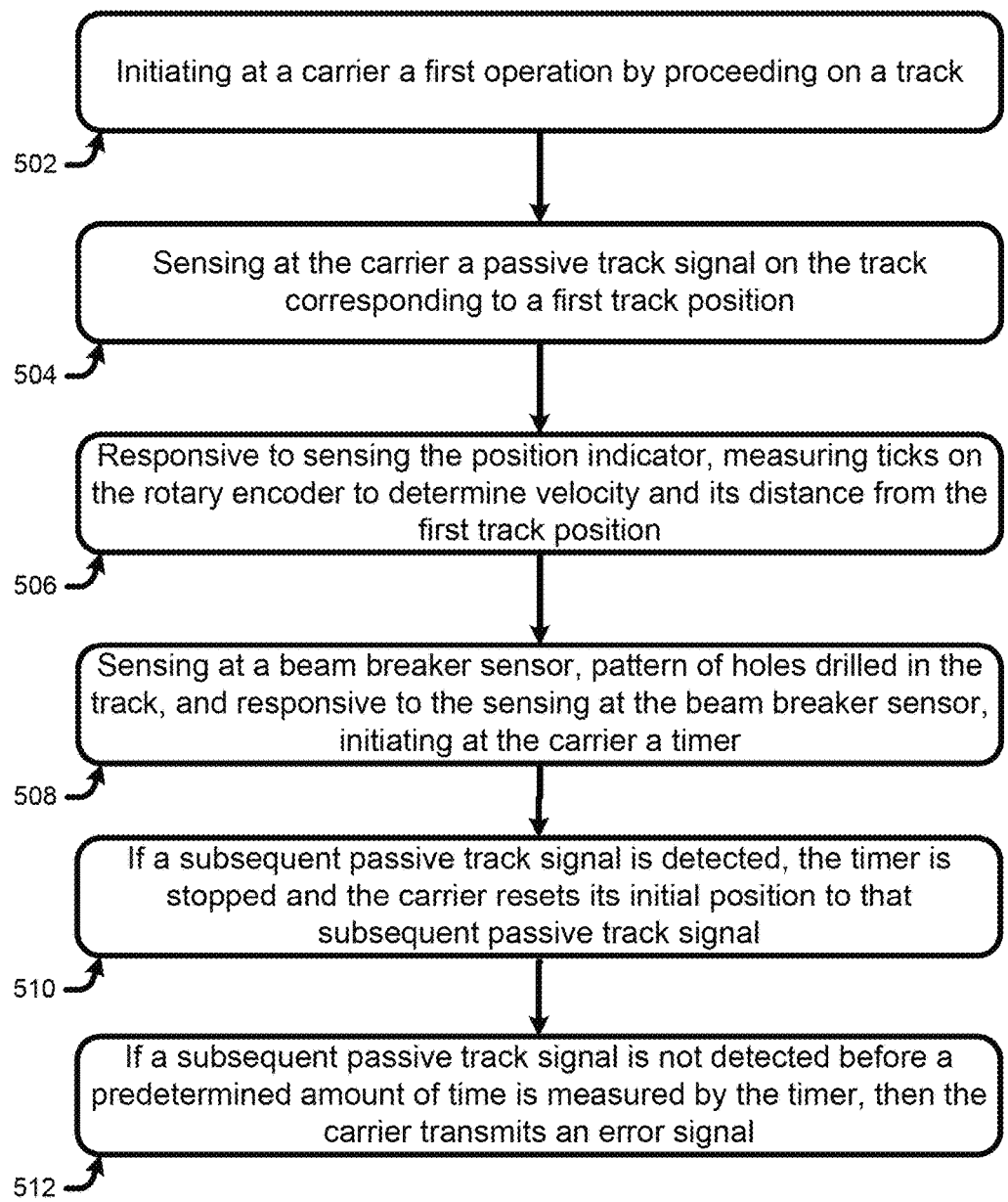
FIG. 5 is a flowchart for processing positioning feedback for a sensor carrier on an intelligent track.

FIG. 5 is a flowchart 500 of the coordination of these various sensors. In block 502, a carrier 102 starts operation by moving down a track 114. In block 504, the carrier 102 senses either a positional magnet or an RFID tag indicating its initial position. In block 506, it starts measuring ticks on the rotary encoder to determine velocity and its distance from its initial position.

In block 508, the beam breaker sensor reads a pattern of holes drilled in the track 114 indicating that a track with an RFID tag or magnet is coming up. The beam breaker sensor may be configured to measure light intensity. Where there are more holes or larger holes, more light passes. The amount of light may be coded to describe upcoming or present track conditions.

Alternatively, the holes may be spaced at different intervals. The pattern of passing light turning on and off based on hole spacing may also be coded to describe upcoming or present track conditions. Finally, holes may be positioned into different patterns for a single scan. The positional patterns of the holes may be coded to describe upcoming or present track conditions.

The carrier 102 then starts a timer to determine the time between receiving the beam break signal and receiving the RFID tag or magnet signal.

In block 510, if the RFID tag or magnet is detected, the timer is stopped and the carrier 102 resets its initial position to that of the RFID tag or magnet.

In block 512, if the RFID tag or magnet is not detected before the timer times out to a predetermined time, then the carrier 102 signals the base station and the user may opt to engage an e-Stop button to stop the carrier 102. The e-Stop button is described with respect to FIG. 6.

Emergency Cutoff Switch for Multiple Track Mounted Carriers

Figure 6:
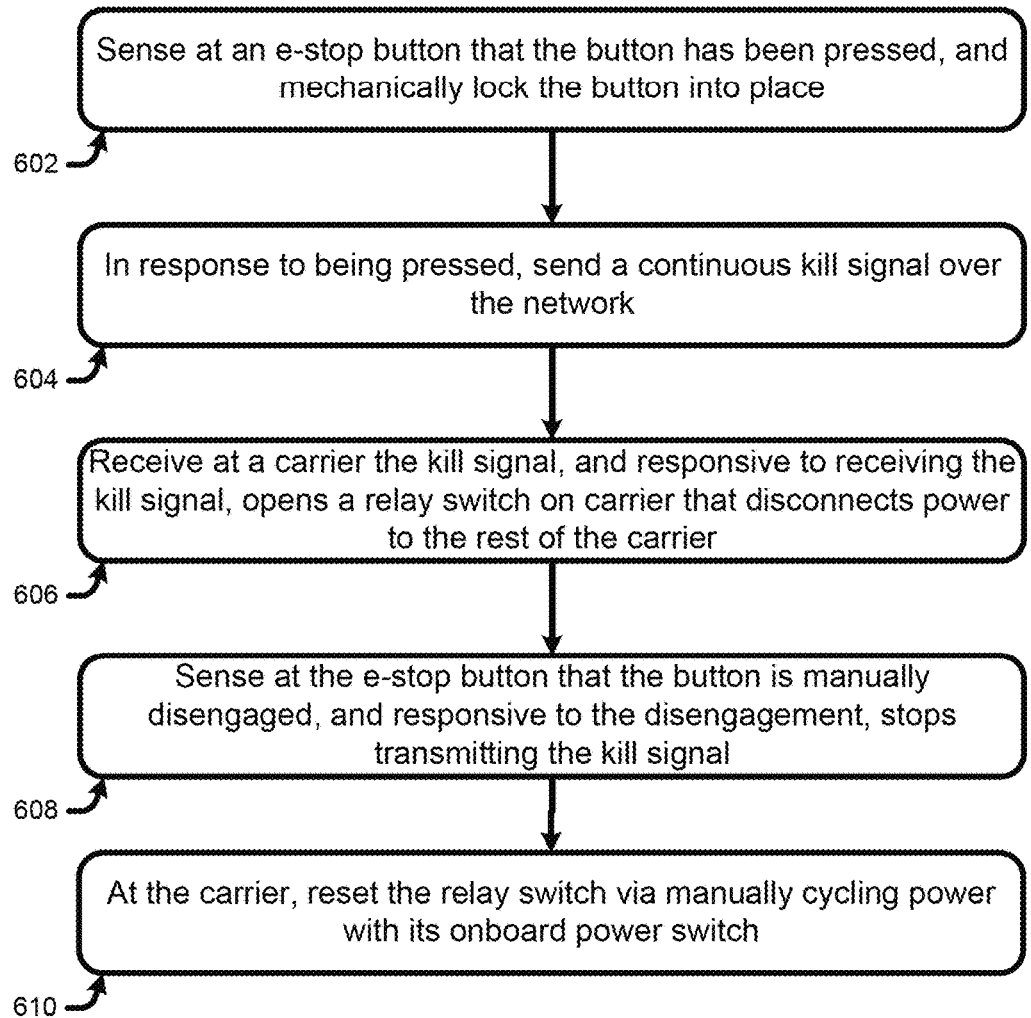
FIG. 6 is a flowchart for processing positioning feedback for a sensor carrier on an intelligent track.

Because a carrier 102 is not tethered to any power source and does not operate in the direct vicinity of users, a typical emergency stop button (e-stop button) is not optimal. Accordingly, the intelligent track and navigation for sensor carriers infrastructure includes a wireless e-stop button. A wireless e-stop button is battery powered and only draws power when its "mushroom top" button is pressed. Once pressed, the button will stay pressed until disengaged by the user. FIG. 6 is a flowchart 600 of the operation of the e-stop button.

Consider the scenario where a user either receives an indication from a carrier 102 or can visually see, that a carrier 102 is amiss. For example, the user may note that a track 114 is out, or that a carrier 102 is in danger of running off a track 114. Alternatively, telemetry from the carrier 102 may appear to be incorrect, and the user may wish to stop operations for debugging.

In block 602, the e-stop button senses that the button has been pressed. The button then mechanically locks into place. In block 604, in response to being pressed, the e-stop button sends via wireless network a continuous kill signal. This kill signal will continue until the e-stop button is disengaged.

Note that each carrier 102 is outfitted with a radio receiver that runs directly off the battery independent of all other systems. In block 606, the carrier 102 receives the kill signal. Responsive to receiving the kill signal, the carrier opens a relay that disconnects power to the rest of the carrier 102.

In block 608, the e-stop button is manually disengaged, and accordingly stops transmitting the kill signal. At this point, every carrier 102 in range of the e-stop button when it was pressed will cease all operations. In block 610, the power relay on each carrier 102 can only be closed again by manually cycling power with its on-board power switch. In this way, in an emergency situation all carriers 102 within range of the kill signal will stop and not restart without intervention by the user.

Power Management for Intelligent Track and Navigation for Sensor Carriers

The carrier 102 is designed to maximize the potential duty cycle of running versus charging. It is advantageous to find a way to minimize power use at times when the device is charging and performing no other operational duties.

One method for the carrier 102 to reduce power consumption is to allow the power circuit to control the power mains on the carrier, including the power to the on-board computer. During long charge cycles (e.g. overnight or other down times), the on-board computer may issue a command to the power circuit to initiate a system hibernation cycle. However, the carrier 102 is autonomous and so is configured to reawaken itself from the hibernation cycle without user intervention. Since the on-board computer is typically the device that issues commands to the power circuit, this technique represents a complete handoff of system control from the on-board computer to the power circuit.

Figure 7:
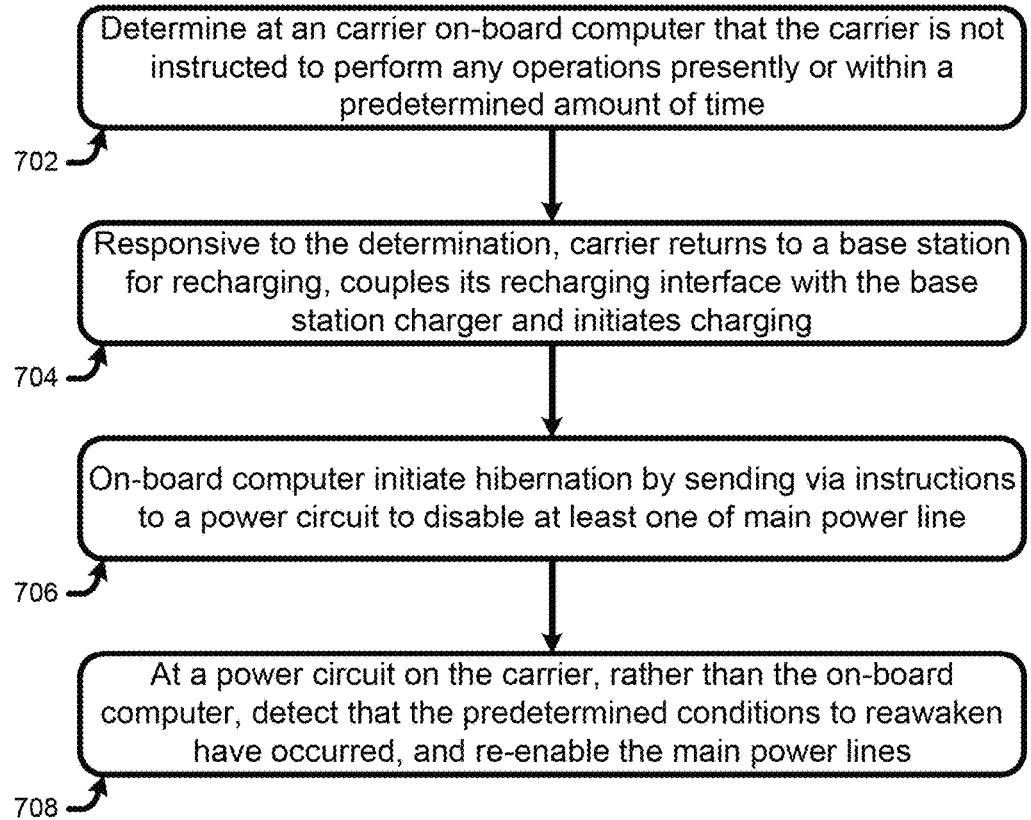
FIG. 7 is a flowchart for performing power management for a sensor carrier on an intelligent track.

FIG. 7 is a flowchart 700 of the hibernation and re-awaken cycle of the carrier 102. In block 702, the on-board computer determines that the carrier 102 is not instructed to perform any operations presently and within a predetermined amount of time. In block 704, responsive to the determination, the carrier 102 returns to a base station for recharging, couples its recharging interface with the base station charger and initiates charging.

In block 706, the on-board computer initiates hibernation by sending instructions to the power circuit to disable at least one of the main power circuits, if not all. The instructions include a condition to reawaken the power circuits after hibernation. Example conditions include a predetermined amount of time to pass prior to reawakening and an indication that a predetermined amount of charge is present in the battery.

In block 708, the power circuit, rather than the on-board computer, detects that the conditions to reawaken have occurred, and re-enables the main power circuits.

As a result, during hibernation and recharge, the on-board computer will be completely unpowered thereby saving power and expediting recharge.

Wall and Gate Transfer Station for Intelligent Track and Navigation for Sensor Carrier As described above, some track segments are connected at sharp angles such that the carrier 102 is unable to turn. For example, a track segment may intersect with another track segment at a 90-degree angle, such that the carrier 102 cannot execute a turn. In these situations, the track 114 may be configured to have a wall and gate transfer station 124 at the junction of the track segments. The transfer station 124 receives a carrier 102 from a first track segment, and mechanically rotates the carrier 102 to orient with a second track segment. Upon completion of the rotation, the carrier 102 continues onto the second track.

The transfer station 124 in effect is a rotating section of track. Accordingly, it is desirable to have a mechanical backup to prevent a carrier 102 from running off the end of the track or otherwise falling off. The transfer station 124 features a rotating table surrounded by stationary wall sections that prevents the carrier 102 from leaving the primary track or leaving the transfer station until the transfer track is properly aligned with the primary track.

Figure 8:
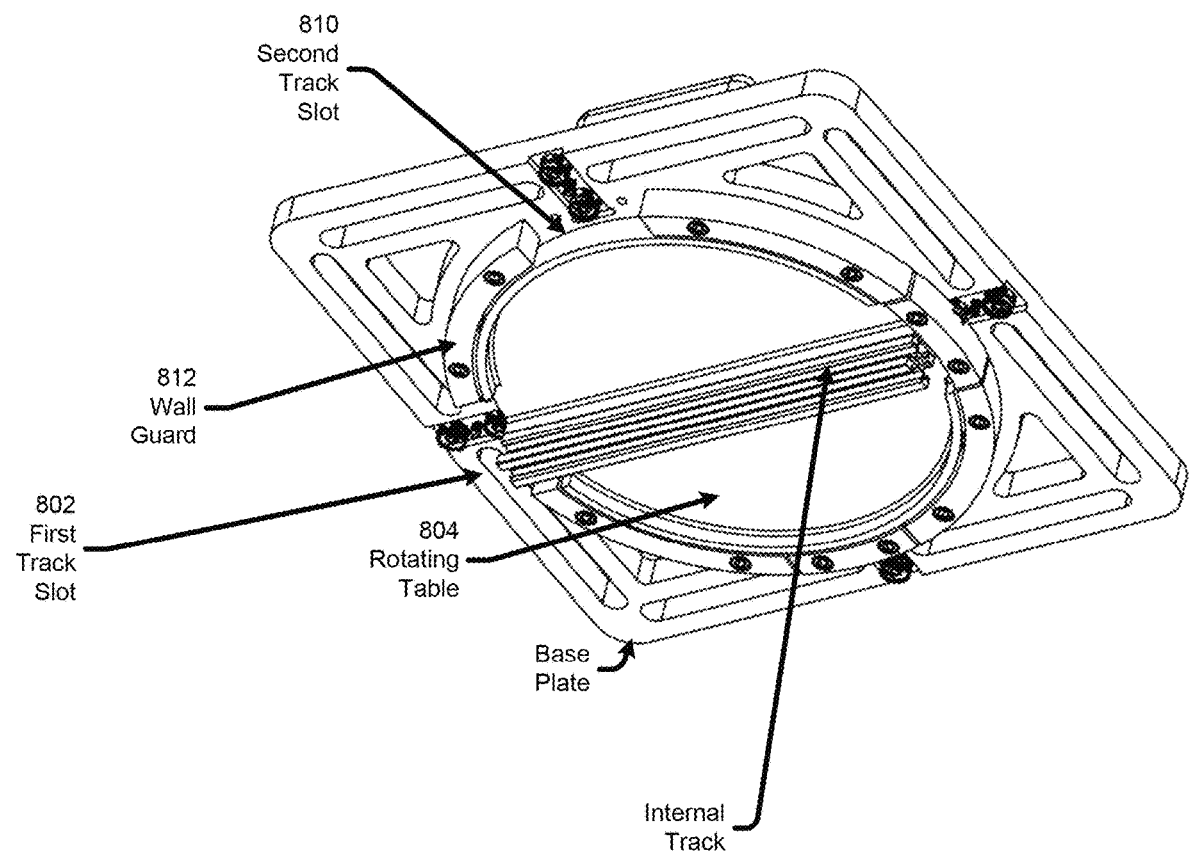
FIG. 8 is a diagram of a transfer station for an intelligent track.
Figure 9:
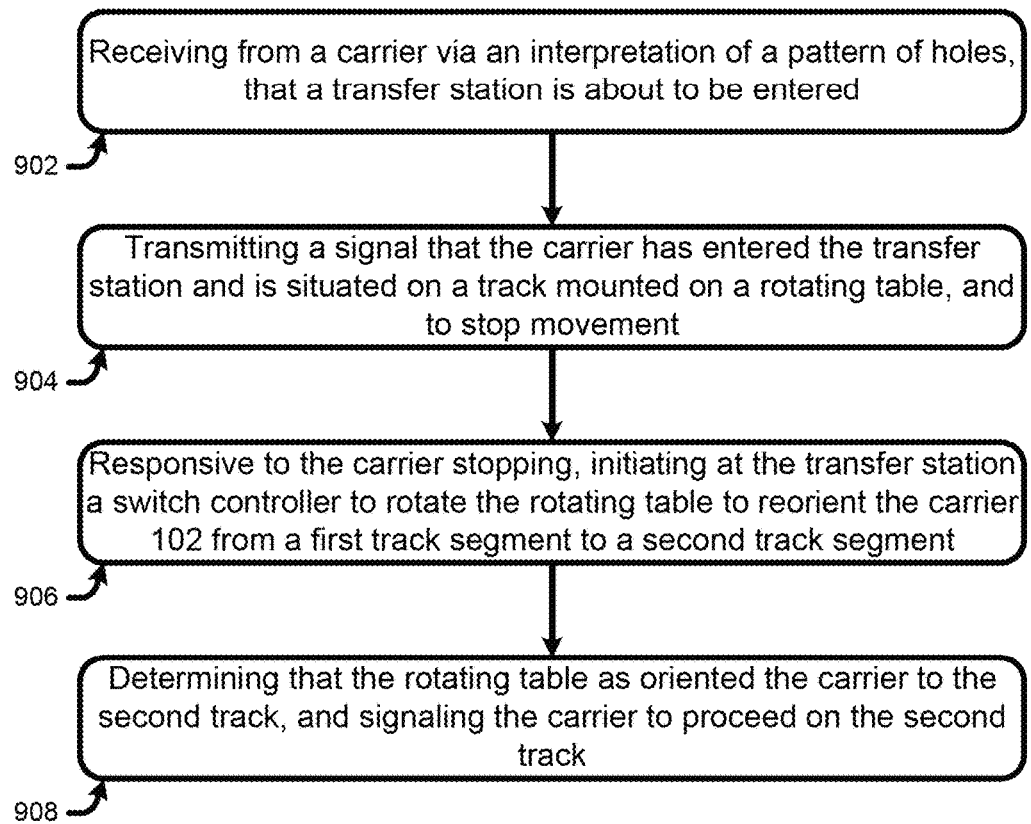
FIG. 9 is a flowchart for the operation of a transfer station on an intelligent track.

FIG. 8 is an illustration 800 of an exemplary transfer station 124. The transfer station 124 includes a first track slot 802, a rotating table 804, and a slot for a second track 810, and a wall guard 812. FIG. 9 is a flowchart 900 of the operation of the transfer station 124. In block 902, the carrier 102 is continuing along a track 114 and passes a pattern of holes allowing beam from a beam transmitter on the carrier 102 to be received by a beam receiver on the carrier. The track 114 had intervened between the transmitter and receiver blocking the beam. Upon passing the pattern of holes, the beam receiver interprets the pattern and informs the carrier 102 that it is approaching a transfer station. If a predetermined amount of time passes without encountering a transfer station, the carrier 102 transmits an error signal.

In block 904, the carrier 102 enters the transfer station 124, 800, and a beam break sensor in the transfer station 124, 800 senses the carrier 102 and tells the carrier 102 to stop.

In block 906, responsive to the carrier 102 stopping, a switch controller (the controller for the transfer station 124) starts a motor to rotate the rotating table 804 as to reorient the carrier 102 from the first track segment to the second track segment. If the rotation applies sufficient force to the carrier 102 to risk a drop, or if the carrier 102 erroneously attempts to move, the wall guards 812 will block the carrier 102.

In block 908, once the rotation is complete, the transfer station 124 signals the carrier 102 that it may move again and proceed to the second track 810.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of facilitating navigation of a robotic carrier mounted on a track in a greenhouse, comprising:
   initiating a first operation at the robotic carrier by proceeding on the track in the greenhouse, wherein the robotic carrier houses one or more cameras that capture images of plants in the greenhouse;
   sensing, at the robotic carrier, a first passive track signal corresponding to a first track position;
   responsive to sensing the first passive track signal, determining by the robotic carrier, a velocity of the robotic carrier from the first track position; and
   moving the robotic carrier on the track in the greenhouse based on the determined velocity of the robotic carrier.

2. The method of claim 1, further comprising:
   upon sensing, by the robotic carrier, an indicator of an upcoming track condition, initiating a timer;
   if a second passive track signal corresponding to the track condition is detected before a predetermined amount of time is measured by the timer, stopping the timer and resetting the first track position to a second track position corresponding to the second passive track signal; and
   if the second passive track signal is not detected before the predetermined amount of time is measured by the timer, transmitting an error signal by the robotic carrier,
   wherein the indicator of the track condition indicates any one of the following:
      a segment of the track having a Radio Frequency Identifier (RFID) tag;
      a segment of the track having a positional magnet; or
      an end of the track.

3. The method of claim 1, wherein the passive signal comprises a Hall Effect generated via a positional magnet embedded within the track.

4. The method of claim 1, wherein the passive signal comprises a trigger signal generated via an RFID tag.

5. The method of claim 4, wherein the trigger causes the robotic carrier to perform any one of the following:
   capture images;
   collect telemetry;
   transmit data including images and telemetry; or
   perform maintenance.

6. The method of claim 2, wherein the indicator of the track condition comprises a pattern of drilled holes in the track, each of the holes in the pattern of holes sufficient to pass light and trigger a beam receiver.

7. The method of claim 6, wherein the pattern of holes in the track are encoded to any one of the following:
   amount of light passing through one or more holes in the pattern of holes;
   a spacing of one or more holes in the pattern of holes; or
   a position of one or more holes in the pattern of holes.

8. The method of claim 6, wherein the pattern of holes indicates that the robotic carrier is approaching a transfer station.

9. A method for a transfer station to coordinate a robotic carrier track transfer, comprising:
   receiving from the sensor carrier, a first signal indicating that a transfer station is about to be entered, the first signal generated by the robotic carrier based on an interpretation of a pattern of holes;
   transmitting, to the robotic carrier, a second signal upon detecting that the robotic carrier has entered the transfer station and is situated on a track mounted on a rotating table, the second signal causing the robotic carrier to stop movement;
   responsive to the robotic carrier stopping, initiating at the transfer station a switch controller to rotate the rotating table to reorient the robotic carrier from a first track segment to a second track segment;
   determining that the rotating table has oriented the robotic carrier to the second track; and
   responsive to the determination, signaling the robotic carrier to proceed on the second track.

10. A transfer station apparatus configured to transfer a robotic carrier between track segments, comprising:
    a transfer station base plate, oriented horizontally;
    a rotating table comprised of a flat disk having a fixed radius, the flat disk situated parallel to and under the transfer station base plate, the rotating table coupled via an axle positioned through a vertical hole in the transfer station base plate to a switch motor;
    a table track segment having a length of a diameter of the rotating table, the table track segment situated under the rotating table and passing through the center of the rotating table;
    a first track segment coupler underneath the transfer station base plate situated radially out from the rotating table and placed with one end at the radius of the transfer station base plate, as to connecting a first track segment to the table track segment;
    a second track segment coupler underneath the transfer station base plate situated radially out from the rotating table and placed with one end at the radius of the transfer station base plate, as to connecting a second track segment to the table track segment, the second track segment not being parallel to the first track segment; and
    wall guards placed underneath the base plate at a perimeter of the transfer station, with a height sufficient to stop the robotic carrier on the track from falling off of the one end, wherein the wall guards have gaps sufficiently wide to allow the robotic carrier to pass from the first track segment to the second track segment.

11. The apparatus of claim 10, wherein at least one of the wall guards, the first track segment coupler, or the second track segment coupler are removable and may be placed into respective slots at the perimeter of the rotating table.

12. The apparatus of claim 11, further comprising:
a wireless communications interface configured to communicate with the robotic carrier over a wireless communications network.

13. The apparatus of claim 12, wherein the wireless communications interface communicates via any one of the following:
Wi-Fi wireless communications; or
cellular wireless communications.

14. The apparatus of claim 12, further comprising:
an emergency stop (e-stop) switch communicatively coupled to the transfer station and to the sensor carrier via the wireless communications network,
wherein upon the e-stop switch being engaged, the sensor carrier is configured to stop operation.

15. The apparatus of claim 13, wherein the sensor carrier is configured to stop operation via a relay switch to a power supply, such that restart of the sensor carrier is activated via a manual cycling of the relay switch.

16. The apparatus of claim 12, further comprising:
a sensor configured to detect that the robotic carrier is in the rotating table of the transfer station, wherein the wireless communications interface is configured to notify the sensor carrier to stop.

17. The apparatus of claim 16, wherein the sensor configured to detect that the robotic carrier is in the rotating table is a beam breaking sensor.

18. The apparatus of claim 12, comprising a sensor configured to detect that the rotating table is oriented to the second track segment, wherein the wireless communications interface is configured to notify the robotic carrier to proceed along the second track segment.

19. A power management apparatus for a robotic carrier, the robotic carrier configured to operate autonomously, comprising:
an on-board computer;
a battery;
a receiving power interface;
a power circuit coupled to the battery and to the on-board computer; and
a power main connected to the on-board computer thereby powering the on-board computer,
wherein the power circuit is configured to receive a charging instruction from the on-board computer to couple the receiving power interface to a charger, and to shut off the power main to the on-board computer and to restore the power main upon a predetermined condition being satisfied.

20. The apparatus of claim 19, wherein the predetermined conditions are any one of the following:
the battery is charged to a predetermined amount; or
a predetermined amount of time has passed.

* * * * *